United States Patent [19]

Kawai et al.

[11] Patent Number: 4,725,830
[45] Date of Patent: Feb. 16, 1988

[54] DATA INPUT APPARATUS

[75] Inventors: Rie Kawai, Nagoya; Shinichi Tomita; Kanzen Gotou, both of Owariasahi; Susuma Ohba, Seto; Makoto Shinohara, Owariasahi, all of Japan

[73] Assignee: Hitachi, Ltd., Tokyo, Japan

[21] Appl. No.: 892,284

[22] Filed: Aug. 4, 1986

[30] Foreign Application Priority Data

Aug. 7, 1985 [JP] Japan .................................. 60-173457

[51] Int. Cl.4 .............................................. G09G 1/16
[52] U.S. Cl. .................................... 340/709; 340/711; 340/724
[58] Field of Search ........................ 340/709, 724, 711

[56] References Cited

U.S. PATENT DOCUMENTS 4,437,093 3/1984 Bradley ................................ 340/724
4,628,444 12/1986 Nozawa et al. .................... 340/709
4,648,046 3/1987 Copenhaver et al. .............. 340/709

FOREIGN PATENT DOCUMENTS 58-219639 12/1983 Japan .

Primary Examiner—Howard A. Birmiel
Attorney, Agent, or Firm—Antonelli, Terry & Wands

[57] ABSTRACT

A data input system of a multi-window mode in which a plurality of logic pictures can be displayed on a physical image screen of a CRT display. An input data once stored in a specified area of a memory is displayed in a selected one of the logical pictures. The system includes at least one logic picture designating device equipped with an indicator lamp, and transfer keys for designating one of the display fields in the logic picture. In accordance with combinations of designation and non-designation of the logic pictures, a data input path of the stored input data to the logic picture in which cursor is present or the logic picture in which cursor is absent is exchangeably selected, whereby the data stored in the specified memory area is transferred for display to the field designated by the transfer key in the selected picture through the input path as established.

11 Claims, 5 Drawing Figures

DATA INPUT APPARATUS

BACKGROUND OF THE INVENTION

The present invention generally relates to a data input apparatus and more particularly to a data input apparatus for a data display system capable of producing a plurality of logic pictures, such as windows, frames or the like on a display screen.

In recent years, a so-called multi-window function, i.e. the function which allows a plurality of logic pictures (frequently referred to as window) to be simultaneously displayed in parallel on a single display screen is widely favored. In that case, the multi-window function can be classified into two categories. First, a plurality of logic pictures are displayed in an overlapping relation to one another. Second, they are displayed discretely, being separated from one another. In the display apparatus imparted with the multi-window function of either one of the above mentioned types, data entry into a first one of the plural logic pictures or windows is effected by moving a cursor therein. When a data is next to be entered in a second logic picture, the cursor has to be moved therein. In this manner, when data are to be inputted sequentially to the first and second logic pictures or windows, the cursor must be moved alternately in the first and second logic windows by correspondingly manipulating the arrow-imprinted cursor keys. This procedure is very troublesome. Further, when data are to be inputted alternately into more than two windows displayed simultaneously, an operator is forced to perform much complicated manipulation of the cursor keys for moving the cursor. In an extreme case, the cursor moving manipulation will require a greater time consumption than the data input operation itself, to a serious problem.

In the hitherto known data entry at locations designated by a cursor, there has been known a method of reducing the time taken for the cursor key manipulation, according to which method the cursor is moved skipwise in a predetermined manner upon inputting of data, as disclosed in JP-A-58-219639 (Japanese Patent Application No. 57-101860 on titled "Buffer Memory Device For Image Processing" filed June 14, 1982) and published Dec. 21, 1983. More specifically, the cursor is moved in a predetermined sequence among simultaneously displayed regions of an image or among logic pictures by skipping a certain region or picture upon every inputting of data. However, this known method suffers a drawback in that the inputting sequence is fixedly predetermined. In other words, data inputting in other sequence than the fixed one is impossible, thus involving a lot of time in the inputting operation. When the sequence of the data inputting of logic pictures is fixed, a problem will then arise in respect that the advantage of independency among the logic pictures or windows will be lost.

SUMMARY OF THE INVENTION

An object of the present invention is to provide data input method and apparatus for a data display system in which the problems of the prior art are eliminated and in which manipulation for moving a cursor is rendered unnecessary when a data is to be entered into one logic picture upon inputting of data in another logic picture in case a plurality of logic pictures are simultaneously (i.e. in parallel) displayed.

According to an aspect of the present invention, there is provided a data input apparatus in which a plurality of logic pictures can be displayed on a physical screen of a display device, such as a CRT display and a data to be inputted is once stored in a specified area of a memory before being displayed in a selected one of the logic pictures or windows. The apparatus includes at least one logic picture designating device equipped with an indicator lamp, and transfer keys for designating one of display fields in the logic picture. In accordance with combinations of designation and non-designation of the logic pictures, a data input path to the logic picture in which a cursor is present or the logic picture in which the cursor is absent is exchangeably selected, whereby the data stored in the specified area is transferred for the display to the field designated by the transfer key in the selected one of the logic pictures through the input path as established.

DESCRIPTION OF THE PREFERRED EMBODIMENTS

In the following, the invention will be described in detail by referring to the accompanying drawings.

Figure 2:
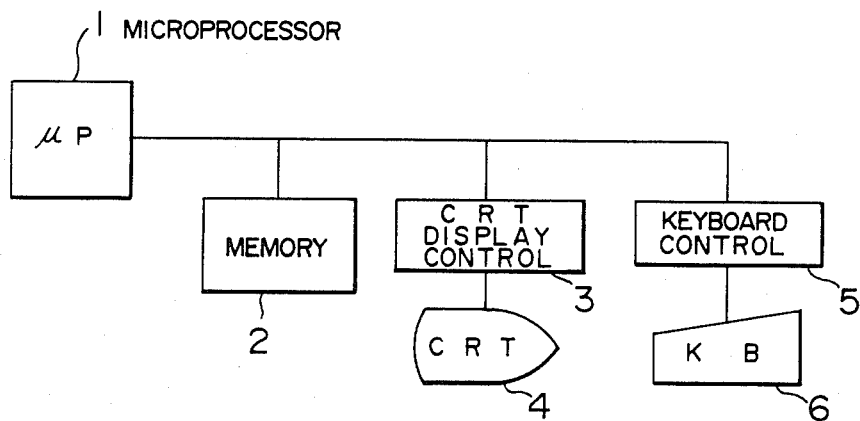
FIG. 2 is a block diagram showing a general arrangement of a display system to which the present invention can be applied.

FIG. 2 is a block diagram showing schematically a general arrangement of a display system to which the present invention can be applied. In the figure, a reference numeral 1 denotes a microprocessor for controlling the whole system, such as the type 8086 available from Intel, a numeral 2 denotes a memory which stores therein programs executed by the microprocessor and data to be processed for the display or other purpose, a numeral 3 denotes a CRT display control unit for controlling a CRT display 4, a numeral 5 denotes a keyboard control unit, and finally a numeral 6 denotes a keyboard.

With the present invention incarnated in the illustrative embodiment, it is contemplated that in the case where a plurality of logic pictures (e.g. two logic pictures) are simultaneously displayed on a physical screen of the CRT display unit 4, inputting or entry of data in one of the logic pictures is effected through manipulation or actuation (depression or touch) of a transfer key to allow the data previously stored in an entry area of the memory to be displayed at a location designated by a cursor, while inputting of data in the other logic picture is effected through manipulation of the transfer key to allow the data of the entry area to be displayed in the field designated by the transfer key, to thereby render unnecessary the cursor manipulation upon every actuation of the transfer key and thus simplify the data inputting operation as a whole with the time required therefor being correspondingly shortened. Parenthetically, the data inputted through the keyboard 6 to be displayed is once stored in the entry area of the memory 2. When the operator designates a particular field of the display screen where a data is to be displayed by operating the keyboard, the data is transferred to the CRT display unit 4 under the control of the CRT control unit 3 which responds to the operator's designation, whereby the data transferred is displayed in one particular field of the designated logic picture.

Figure 1:
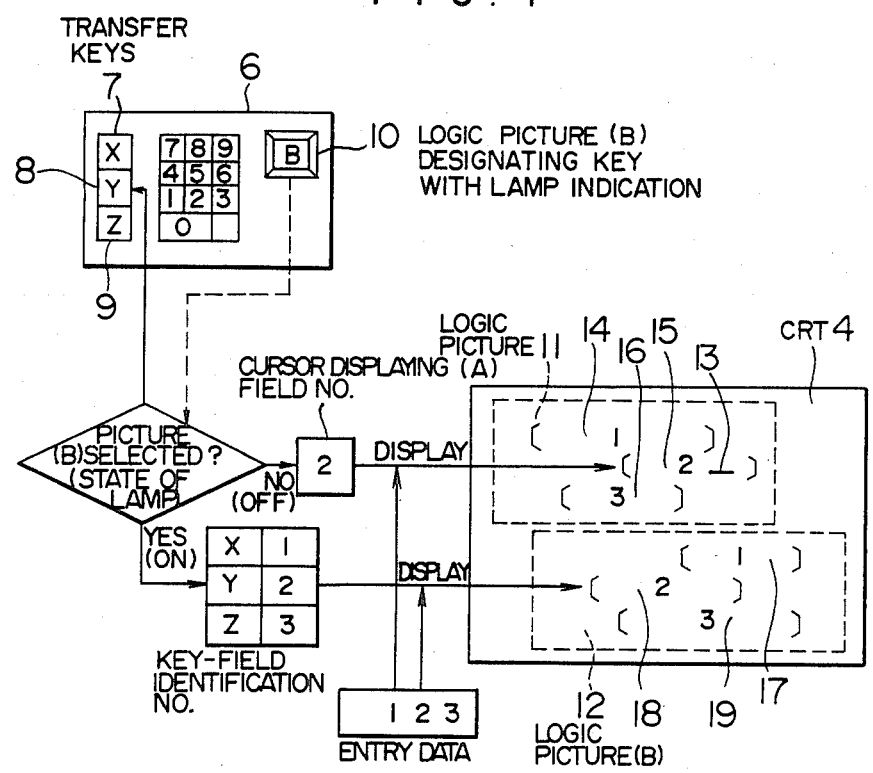
FIG. 1 is a view for illustrating the relationship between keyboard and display regions in a data input apparatus according to an exemplary embodiment of the present invention.

FIG. 1 is a schematic diagram for illustrating the relationship between manipulations of the keyboard and the display fields in the data input apparatus according to an embodiment of the present invention on the assumption that the number of the logic pictures capable of being displayed simultaneously on a single physical screen is two by way of example. In FIG. 1, a reference numeral 6 denotes a keyboard corresponding to the one designated by the numeral 6 in FIG. 2, and a numeral 4 denotes a CRT display unit corresponding to the one denoted by 4 in FIG. 2. Disposed on the keyboard 6 is a key array including transfer keys 7, 8 and 9, ten keys labeled with numerals "0" to "9" and a logic pictures (B) designating key 10. The key 10 incorporates a lamp for indicating the state of designation. More specifically, when the indicator lamp is deenergized (i.e. off), this means that data input path to a logic picture (A) is selected, while the lighting state of the lamp indicates the data input path to the logic picture (B) is selected. It should however be understood that the indicator lamp may be provided at other locations and may be of color indications. Accordingly, when the logic picture (B) designating key 10 is actuated in the state in which the indicator lamp is off, a picture-B selection command signal is produced, as a result of which the indicator lamp is lit. In response to the picture-B selection command signal, the microprocessor 1 causes the display control unit 3 to allow the display in the area of the logic picture (B), whereby the data stored previously in the entry area of the memory 2 is displayed within the logic picture (B). On the other hand, when the logic picture (B) designating key 10 is actuated in the state in which the indicator lamp is lighting, a picture-B non-selection command signal is issued, whereupon the light is put out. In response to this non-selection signal, the microprocessor 1 instructs the display control unit 3 such that the logic picture (A) be selected for the data entry. As a result, the data stored previously in the entry area of the memory 2 is displayed within the logic picture (A) at a location designated by the cursor.

Arrayed alterably on the screen of the CRT display 4 are a logic picture (A) region 11 and a logic picture (B) region 12, wherein each of the logic picture regions includes a plurality of display fields. For convenience of illustration, the logic picture (A) region 11 is shown as including three display fields "1", "2" and "3" denoted by reference numerals 14, 15 and 16, respectively, while the logic picture (B) region 12 includes three display fields "1", "2" and "3" as denoted by numerals 17, 18 and 19. The system shown in FIG. 2 is so arranged that a one-to-one correspondence relationship can be realized between the display fields "1", "2" and "3" and the transfer keys "X", "Y" and "Z" denoted by 7, 8 and 9 on the keyboard 6 under control of a program stored in the memory 2. More specifically, when the transfer key 7 is actuated, the field 14 or 17 of the logic picture region 11 or 12 is selected. Upon actuation of the transfer key 8, the field 15 or 18 of the logic picture 11 or 12 is selected. Finally, actuation of the transfer key 9 results in selection of the field 16 or 19 of the logic picture region 11 or 12.

In conjunction with the operative connection between the keyboard 6 and the CRT display 4, it is to be noted that data of cursor diaplay field identification number (No.) identifying the field where the cursor is being displayed, a table listing correspondence between the key types and the field numbers and the entry area are stored in predetermined areas of the memory 2 shown in FIG. 2. Further, a decision block schematically labeled "Lamp State" illustrates a manner in which the logic picture with no cursor is selected.

Turning to FIG. 1, the microprocessor 1 reads out the program stored in the memory 2 for execution thereof to control the CRT control unit 3, the keyboard control unit 5 and others. In the first place, when the operator actuates one of the transfer keys 7, 8 and 9 on the keyboard 6, the keyboard control unit 5 recognizes the type of the actuated key to send a key identifying signal to the microprocessor 1 over a common bus. In response to this identification signal, the microprocessor 1 selects one of the logic pictures on the basis of the designation data of the logic picture (B) stored in the memory 2, whereby the entry data (i.e. data to be entered or inputted) stored in the entry area of the memory 2 is displayed in the corresponding display field of the selected picture region on the CRT display unit 4. More specifically, in the state where the logic picture (B) designation is not selected (i.e. the designation indicating lamp is deenergized or off), the data to be entered (e.g. numerical data 1, 2 and 3 in the case of the example illustrated in FIG. 1) is displayed in the display field 15 corresponding to the numeral representative of the cursor displaying field identification number (e.g. numeral "2" in the case of the example illustrated in FIG. 1) which is stored in the memory 2. On the other hand, when the logic picture (B) designation is selected (i.e. the designation indicating lamp is lit), the logic picture (B) is selected, whereby the data to be entered (1, 2, 3) stored in the memory 2 is displayed in the field corresponding to the transfer key (X, Y or Z) actuated by operator. By way of example, suppose that the operator actuates the transfer key "Y". Then, the corresponding recognition signal is sent to the microprocessor 1 from the keyboard control unit 3. In response to this signal, the microprocessor consults the key-type vis-a-vis field identification number table stored in the memory 2 to select the corresponding field No. 2, to thereby instruct the display control unit 3 to display the entry data (1, 2, 3) in the field 18 of the logic picture (B) on the CRT display 4.

Figure 3:
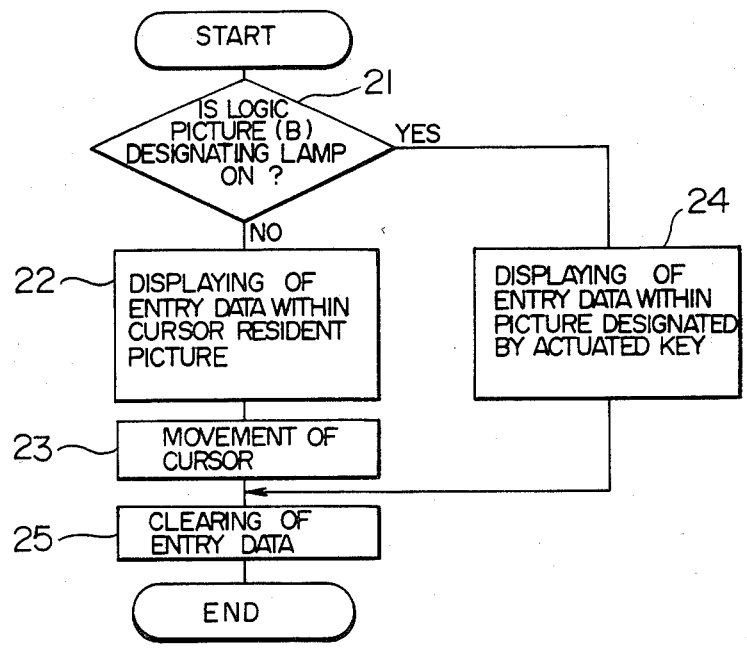
FIG. 3 is a flow chart for illustrating display processing executed upon actuation of a transfer key.
Figure 4:
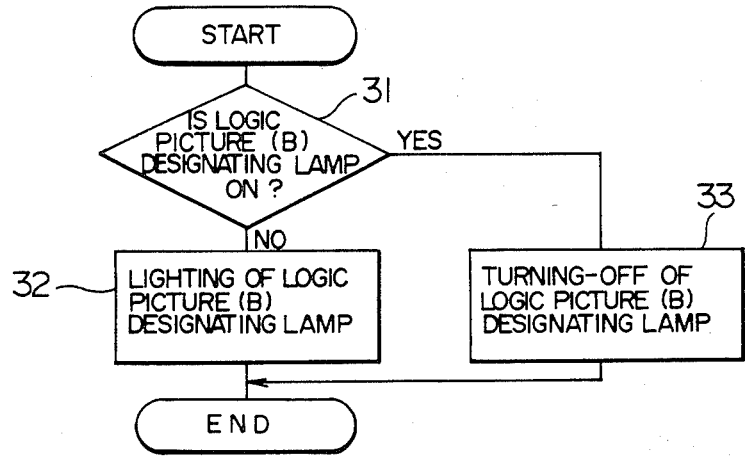
FIG. 4 is a flow chart for illustrating processing for inverting the indicator lamp state upon actuation of a logic picture (B) designating key according to the teaching of the invention.

FIG. 3 is a flow chart for illustrating the procedure executed when an entry data is to be displayed in the corresponding display field in response to the actuation of the transfer key according to the invention, and FIG. 4 shows a flow chart for illustrating the procedure executed for inverting the designation state (lamp state) upon actuation of the logic picture (B) designating key 10 in accordance with the illustrative embodiment of the invention.

The microprocessor 1 responds to the signal identifying the transfer key actuated by the operator to execute the data entry and the display processing illustrated in the flow chart of FIG. 3, starting from the current logic picture (B) designating state (i.e. the lamp lighting state). Upon reception of the signal indicating the operator's actuation of the logic picture (B) designating key 10, the microprocessor 1 executes the processing illustrated in FIG. 4 to invert the logic picture (B) designation (lamp) state stored in the memory 2 for updating the logic picture selection.

At first, it is assumed that the indicator lamp of the logic picture (B) designating key 10 is in the deenergized or off state. On the assumption, when the transfer key 8 is actuated, it is decided that the logic picture (B) designation state stored in the memory 2 is not to be selected (i.e. the indicator lamp is off) at a step 21, whereupon the entry data stored in the memory 2 is displayed through the CRT control unit 3 in the field 15 of the logic picture (A) region designated by the cursor displaying field identification number also stored in the memory 2 (step 22), and at the same time the cursor displaying field identification number is updated to sequentially move the cursor 13 to a next display area 16 in the logic picture (A) region (step 23). Subsequently, the entry data stored in the entry area of the memory 2 is cleared (step 25).

Now, it is assumed that the indicator lamp of the logic picture (B) designating key 10 is lit. When the transfer key 8 is actuated, the processor 1 receives the signal produced by the keyboard control unit 5 and identifying the transfer key manipulated by the operator, decides that the logic picture (B) designating lamp is lighting or ON (step 21), and consults the table stored in the memory 2 to recognize the field number corresponding to the actuated transfer key, whereby the entry data stored in the memory 2 is displayed in the field 18 of the logic picture (B) region 12 designated by the field identifying number (step 24). Subsequently, the entry data is cleared from the memory 2 (step 25).

Referring to FIG. 4, when the signal indicating operator's actuation of the logic picture (B) designating key 10 is issued by the keyboard control unit 5 to the processor 1, the latter checks the current logic picture (B) designation state stored in the memory 2. When the logic picture (B) is selected (i.e. the indicator lamp is on), it is decided that the operator's key manipulation is intended for the cancelling operation. Consequently, the processor 1 supplies to the memory 2 a signal instructing the setting of the logic picture (B) designation state to the non-selected state, as a result of which the indicator lamp is put out (step 31, 33). On the other hand, checking of the logic picture (B) designation state stored in the memory 2 by the processor 1 has turned out that the non-selection state is designated (i.e. the indicator lamp is off), it is decided that the operator has actuated the key 10 with the intention to select the logic picture (B), whereupon the logic picture (B) designation state data in the memory 2 is set to the state to be selected, and thus the indicator lamp of the key 10 is turned on (step 32).

Figure 5:
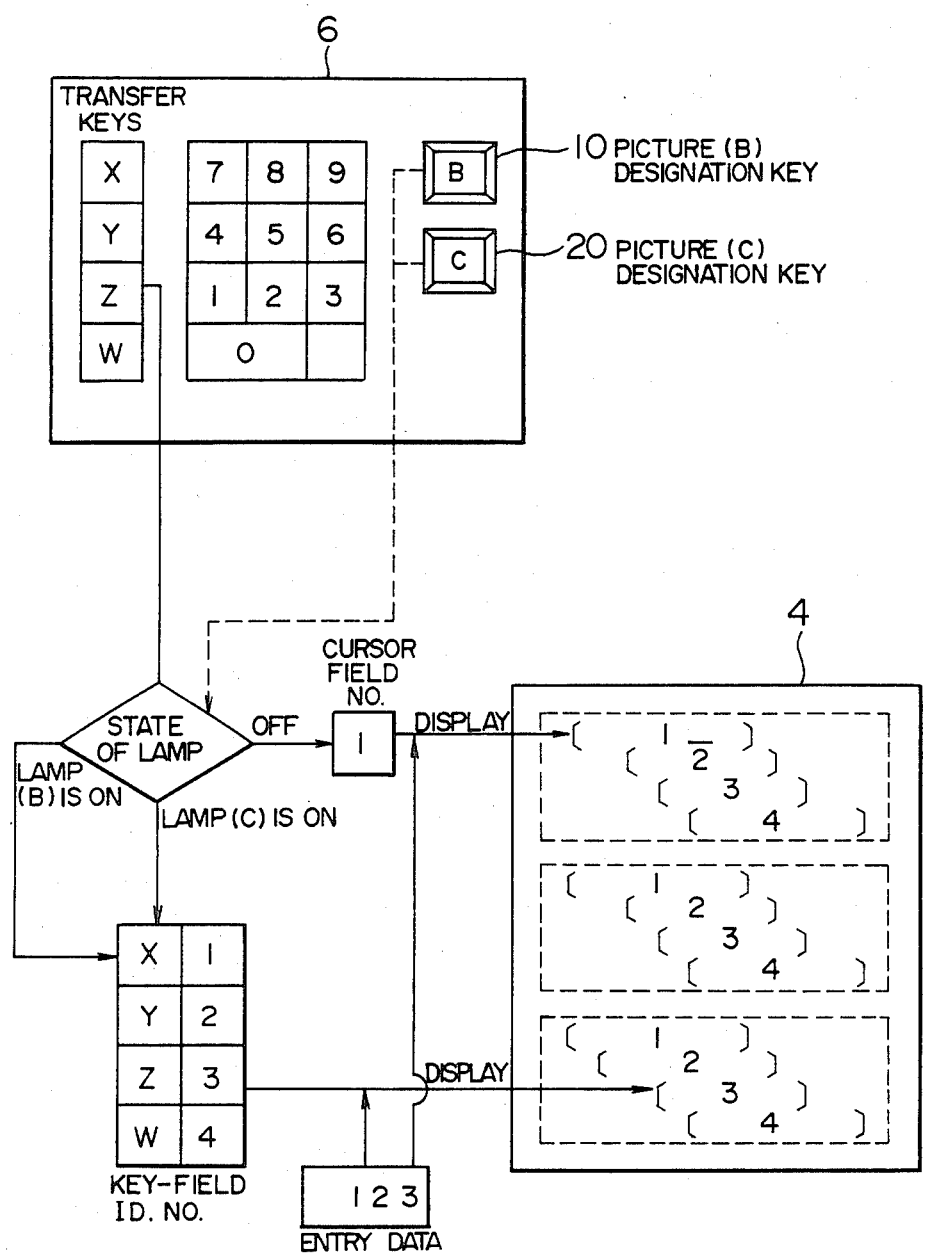
FIG. 5 is a schematic diagram for illustrating relationships between the keyboard and the display regions in a data input apparatus according to another embodiment of the present invention.

FIG. 5 is a schematic diagram illustrating correspondence relationships between the keys of the keyboard and the display regions according to another embodiment of the present invention.

In the foregoing description of the first embodiment of the invention shown in FIG. 1, it has been assumed that the two logic pictures are to be simultaneously displaced on a single physical image screen (a so-called parallel display). It should however be understood that the invention can be equally applied to the case where three or more logic pictures are to be displayed. FIG. 5 shows, by way of example, a simultaneous display of three logic pictures on a single image screen, wherein each of the logic pictures includes four fields. In this case, four transfer keys X, Y, Z and W are provided in the keyboard 6 together with two lamps 10 and 20 for designating the logic pictures (B) and (C), respectively. Each logic picture may have a different number of fields as needed. Further, the key-type vis-a-via field number correspondence tables 1, 2, 3 and 4 are provided in correspondence with the transfer keys X, Y, Z and W. When the operator desires to display the logic picture (A), the logic picture (B, C) designation states are set to the state not to be selected (i.e. both lamps indicating the designation of the logic pictures (B) and (C) are turned off) and the transfer key corresponding to the field to be displayed is actuated. More specifically, when the logic picture (B) is to be displayed, the lamp of the logic picture (B) designating key 10 is turned on, while the lamp of the logic picture (C) designating key 20 is turned off, and the corresponding transfer key is actuated. On the other hand, when the logic picture (C) is to be displayed, the logic picture (B) designation indicating lamp 10 is turned off with the logic picture (C) designation indicating lamp 20 being turned on. Subsequently, the corresponding transfer key is actuated.

When four logic pictures are to be displayed in parallel on a single physical image screen, two designation keys (lamps) are sufficient for indicating the designation of the logic picture (B), (C) or (D) in a binary representation. Upon designation of the logic picture (A), both the indicator lamps are turned off. The designating the logic picture (B), only the designating lamp for picture (B) may be turned on. For designating the logic picture (C), only the lamp for picture (C) may be turned on. For designating the logic picture (D), both of the lamps may be turned on. Designation of four logic pictures may be indicated by housing lamps in two transparent keys in combinations of designation labels or colors.

As will be appreciated from the foregoing description, selection as to whether the entry data is to be displayed within the logic picture (A) in which the cursor is located or in the logic picture where the cursor is absent can be accomplished solely through the manipulation of logic picture designating key or keys. Additionally, the field of each logic picture in which the data is to be displayed can be selected through the manipulation of the transfer key. Thus, the selective data entry in a plurality of logic pictures can be attained in a much facilitated manner.

As will now be appreciated from the foregoing description, displacement of the cursor is not required at all when a data is entered in one logic picture in succession to the entry of data in other logic picture.

By virtue of this feature, the time taken for key manipulation can be significantly shortened, while assuring the independency of the logic pictures from one another.

The present invention is also applicable to other various display devices than the CRT device, such as an LCD (liquid crystal display), a matrix LED display or a photochromic display. The size of logic picture may be set freely by specifying the start point and the end point on the display screen. The logic picture may be set in a required shape by combining a plurality of unit logic pictures.

We claim:

1. A data input apparatus for a data display system in which a plurality of logic pictures can be simultaneously displayed on a single physical image screen of a display device and in which input data can be selectively displayed within said logic pictures after having once stored in a memory at a specific area; comprising:

logic picture designating means for designating at least one logic picture;

transfer key means for designating one of a plurality of display fields in each of said logic pictures;

selecting means for exchangeably selecting one of data input paths from said specified area to the logic picture where a cursor is present or to the logic picture where the cursor is absent in accordance with combinations of logic picture designating output signals produced by said logic picture designating means; and display executing means coupled between said selecting means and said display device, for allowing the input data of said specific area to be transferred and displayed in the field of the logic picture selected by said selecting means.

2. A data input apparatus according to claim 1, wherein said logic picture designating means includes at least one key for designating one of said plurality of logic pictures, further comprising a memory for holding data representing the designation states of said logic pictures in combination with data inputted through said designating key.

3. A data input apparatus according to claim 2, wherein said designating key of said logic picture designating means is combined with visual indicator means indicating the designation state of the corresponding logic picture, and the apparatus comprises control means for controlling the display so that the data input path is established only for a first one of said logic pictures in correspondence with the presence of the cursor.

4. A data input apparatus according to claim 3, wherein said visual indicator means includes lamps, binary combinations of energized and deenergized states of said lamps indicating the designation states of said logic pictures, designation of said first logic picture being indicated by the deenergized states of all the lamps.

5. A data input apparatus according to claim 3, wherein said transfer key means is enabled to designate the field of the corresponding one of the other logic pictures than said first logic picture upon designation of said corresponding one logic picture, and thus, serves for the cursor function within said one logic picture.

6. A data input apparatus according to claim 5, wherein said transfer key means is operatively coupled to a table listing correspondence between transfer key types and field identification numbers and a memory storing a number identifying the field in which the cursor is being displayed, and responds to the input through manipulation of a transfer key to read out the content from said memory for indicating the display field for the input data to the display control means.

7. A data input apparatus according to claim 6, wherein said display device is composed of a cathode ray tube (CRT).

8. A data input method for a data display system in which a plurality of logic pictures can be displayed on a single physical screen of a CRT display, comprising the steps of:

storing an input data to be displayed on a desired one of said logic pictures in a specified area of a memory;

designating one of said plurality of logic pictures and storing corresponding designation data;

discriminating the logic picture in which a cursor is located from the other logic pictures on the basis of said logic picture designation data stored for establishing an input path to said CRT display for said stored input data; and designating one of a plurality of display fields in said designated logic picture, generating information corresponding to a cursor function when no cursor is present in said designated logic picture, and enabling transfer and display of said input data in said designated field of said designated logic picture on the CRT to which said input path has been established.

9. A method of interactively inputting a data to be displayed in a data display system in which a plurality of logic pictures can be displayed in parallel on a display device and the input data to be displayed is once stored in a specified area of a memory before being displayed in a corresponding one of said logic pictures, comprising the steps of:

providing logic picture designating means for designating at least one logic picture and transfer key means for designating one of a plurality of display fields of the designated logic picture;

storing the input data to be displayed in a memory; and identifying the designated logic picture on the basis of combination of the outputs of said logic picture designating means, transferring and displaying, based on the result of the identification, said stored input data at a location designated by a cursor when designation of a first one of said logic pictures is identified and in the field of the logic picture designated by said transfer key means when designation of another logic picture than said first one is identified.

10. A data inputting method according to claim 9, wherein said input data is displayed at the location of said cursor in said first logic picture, said input data being moved sequentially to other display fields of the same logic picture while the data having been displayed is cleared from the memory.

11. A data inputting method according to claim 9, wherein said logic picture designating means includes keys with lamps for indicating binary states by energized and deenergized states thereof, the signal representative of said binary state being stored in a memory as the logic picture designating signal, said designating signal being adapted to be altered by operator on the basis of indication of said lamps.

* * * * *